July 29, 1930.  A. D. BLANCHARD  1,771,949
HOSE FITTING
Filed Aug. 30, 1928
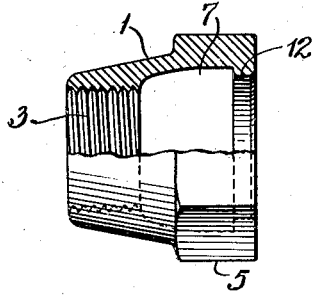
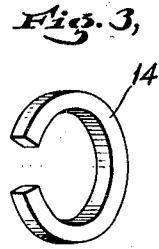
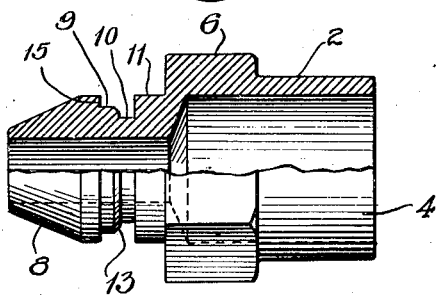
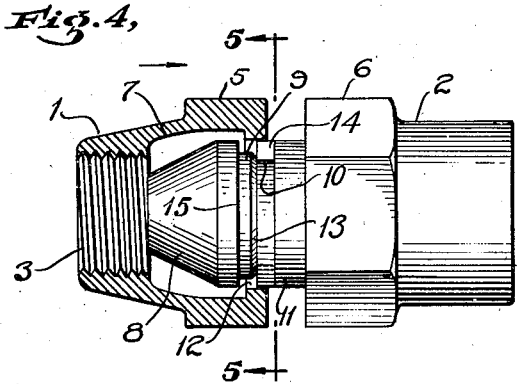
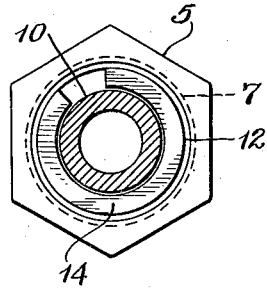
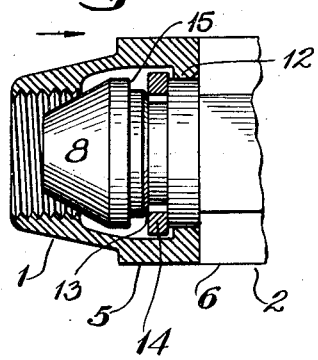
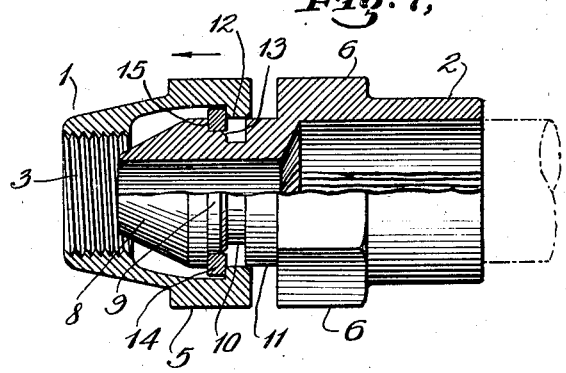
INVENTOR.
ARTHUR D. BLANCHARD
BY
Meyerso Jones
ATTORNEYS.

Patented July 29, 1930

1,771,949

UNITED STATES PATENT OFFICE

ARTHUR D. BLANCHARD, OF BLOOMFIELD, NEW JERSEY, ASSIGNOR TO CHARLES CORY & SON, INCORPORATED, OF NEW YORK, N. Y., A CORPORATION OF NEW YORK

HOSE FITTING

Application filed August 30, 1928. Serial No. 302,980.

This invention is an improvement in hose fittings and more particularly in fittings of the swivel type.

In the usual construction of fitting for connecting two hose sections, for instance, the members of the fitting are held together by a locking ring, engaging registering grooves in the inner and outer members.

In order to enable the insertion of the locking ring, an opening is usually provided extending from the exterior of the outer member to the registering grooves and substantially tangential to said grooves. Through this a wire is forced into the registering grooves, and the opening is closed in any suitable manner.

It will be apparent that this method of assembling is involved and expensive, requiring three separate operations, namely; the formation of the opening, the insertion of the key, and the closing of the opening.

One of the primary objects of the present invention is the provision of a lock, which while enabling free angular movement of the coupling parts with respect to each other, positively prevents movement of the parts away from each other, and which may be quickly and easily assembled.

Another object is the provision of a construction wherein the locking assembly is brought into locking arrangement, by the fitting of the coupling parts one into the other.

Another object is the provision of a simple and inexpensive locking arrangement, which does not materially increase the cost of the fitting.

With these and other objects in view the invention consists in the construction and novel combination of parts fully described hereinafter, illustrated in the accompanying drawings, and pointed out in the claims appended hereto, it being understood that various changes in the form, proportion, size and minor details of construction within the scope of the claims, may be resorted to without departing from the spirit of the invention.

In the drawings forming a part hereof:—

Fig. 1 is a top plan, partly in section, of the outer member of the fitting.

Fig. 2 is a similar view of the inner member.

Fig 3 is a perspective view of the locking split ring.

Figs. 4, 6 and 7 are plan views with parts in section, showing the several steps of the assembling operation.

Fig. 5 is a section on the line 5—5 of Fig. 4.

In the present embodiment of the invention the improved fitting comprises cooperating members 1 and 2, for connection with the parts to be swiveled together. The member 1 is internally threaded as shown at 3, for threaded engagement with one of the parts, and the member 2 is internally enlarged at one end, as shown at 4, for engagement by the other section. Both members are enlarged externally at their meeting ends, as shown at 5 and 6 respectively, and the enlargements are externally polygonal.

The bore of the member 1 is internally enlarged at the opposite end from the threaded portion 3, to provide a socket 7, and the inlet of the socket is restricted as shown by an inwardly extending annular shoulder 12. The other member 2 has an extension at the corresponding end, which is adapted to be received within the socket. The extension includes a head 8, which is the frustum of a cone with its base toward the member 2, and a neck connecting the head with the member. The neck is composed of three parts, 9, 10 and 11 of unequal diameter.

The diameter of the inlet is substantially that of the largest cross section of the head 8 and that of the part 11 of the neck, the said part and the largest cross section of the head being of substantially the same diameter. That is, the diameter of the inlet is such that it will permit the passage of the head and will receive the part 11 of the neck.

The part 10 of the neck is of least diameter and the diameter of the part 9 is intermediate that of the parts 10 and 11. The free edge of the part 9, that is, the edge adjacent to the part 10, is beveled as shown at 13, for a purpose to be presently described. A split locking ring 14 is provided for locking the members together in swiveled connection, and the external diameter of the ring when it is in normal condition is greater than that of the restricted inlet of the socket, so that when the ring is passed through the inlet into the socket it will by its expansion, the ring being resilient, engage the inner side of the shoulder and will prevent release of the head from the member 1.

In assembling the connection, the split ring is placed about the part 10 of the neck, and in such position it may be contracted so that it will pass through the inlet and will enter the socket as shown in Fig. 6. When now the members 1 and 2 are moved apart, the beveled edge 13 of the part 9 of the neck will further expand the split ring, so that the parts will assume the position of Fig. 7, and the ring will be between the shoulder 12 and the shoulder 15, formed between the head 8 and the part 9 of the neck.

While the members 1 and 2 may move freely, angularly with respect to each other, they cannot be separated, the ring holding them in the relation of Fig. 7. The parts are easily assembled, and the ring will hold its position on the neck part 10 prior to assembly, since it is much greater than a semicircle. That is, the ring can not fall off of itself. The natural movement of the members away from each other under pulling stress will properly seat the ring, even should it be left in the position of Fig. 6, and in such position there is a locking relation between the parts. When the ring is in the position of Fig. 7, it is under tension to some extent, and hence clasps the neck part 9 closely enough so that it will not slip off onto the neck part 10 when the members are moved together.

It will be apparent from the description that the improved coupling includes complementary tubular members 1 and 2, one having a socket, and the other a head to enter the socket, and that the inlet of the socket is restricted to fit the head. The members are connected by the locking ring, and the neck is so constructed as to provide portions to seat the ring in expanded or contracted condition, and with a portion to expand the ring.

While the improvement is described as a connection for hose parts, it is obvious that it is adapted for connections of any character, and not necessarily for the connection of flexible members. The type of head shown on member 2 is shown for convenience only, and it will be understood that while the head shown is of the male type, the invention is equally suitable for a head of the female type.

What is claimed as new is:

1. A swivel coupling including complementary tubular members, one having at one end a socket with a restricted inlet, and the other a head shaped to fit and enter the inlet, and connected to the member by a restricted neck composed of two parts of unequal diameter, and a split locking ring of a thickness to enter the inlet when clasping the part of the neck of smallest diameter and adapted to be expanded and to be seated upon the part of greatest diameter when past the inlet to form a lock between the same and the head, the neck having a beveled surface between the parts of unequal diameter to expand the ring and force it onto the part of greater diameter.

2. A swivel coupling including complementary tubular members, one having at one end a socket with a restricted inlet, and the other a head shaped to fit and enter the inlet, and connected to the member by a restricted neck, an annular ledge being provided between the neck and the head, and a split locking ring of a thickness to enter the inlet when clasping the neck and to engage the restricted inlet when seated on the ledge, and resilient to expand after the passage of the inlet, the head having means to expand the ring and seat it on the ledge.

3. A swivel coupling including complementary tubular members, one having at one end a socket with a restricted inlet, and the other a head shaped to fit and enter the inlet, and connected to the member by a restricted neck, and a split locking ring of a thickness to enter the inlet when clasping the neck, said head having an annular shoulder of greater diameter than the normal diameter of the ring, and a beveled surface to expand the ring and guide it onto the shoulder.

Signed at 183–187 Vareek St. in the county of New York and State of New York this 27th day of Aug. A. D. 1928.

ARTHUR D. BLANCHARD.